Aug. 20, 1940.  W. S. ROLLINGS  2,212,076
ANTISKID DEVICE
Filed Jan. 15, 1940   3 Sheets-Sheet 1

William S. Rollings,
INVENTOR

Aug. 20, 1940.  W. S. ROLLINGS  2,212,076
ANTISKID DEVICE
Filed Jan. 15, 1940  3 Sheets-Sheet 2
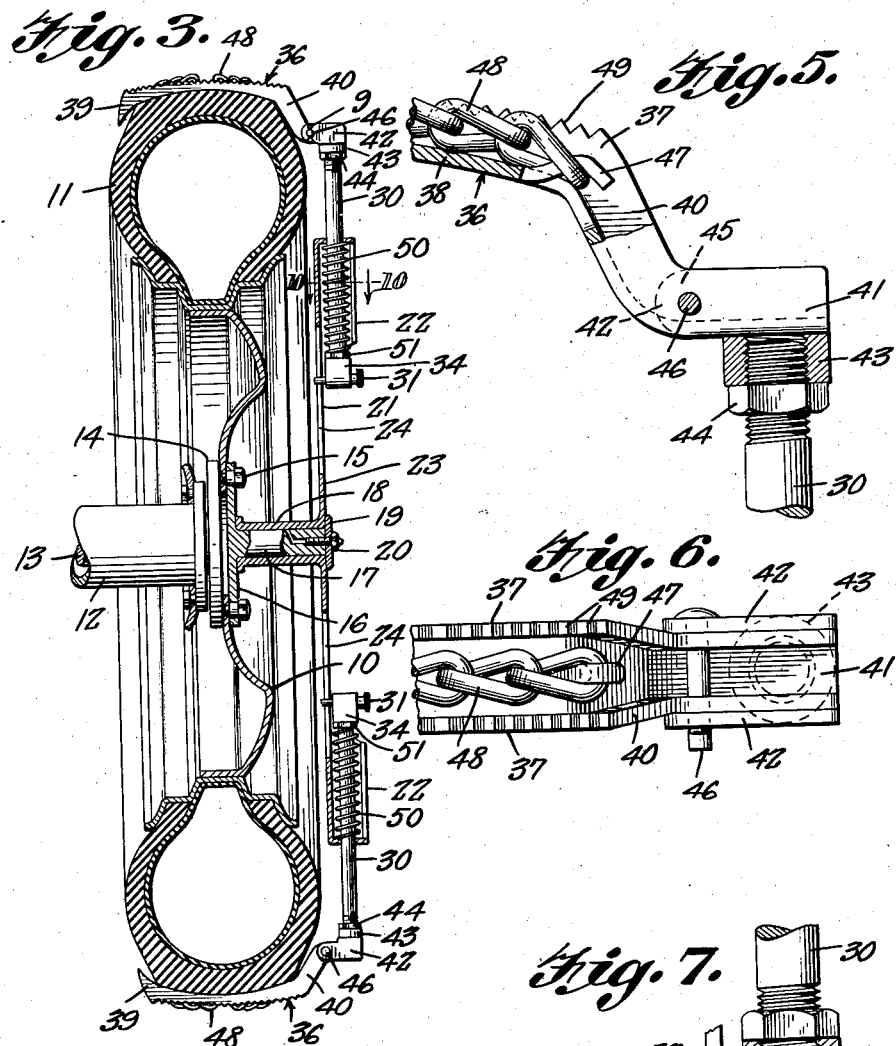
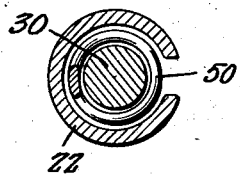
William S. Rollings,
INVENTOR
BY Victor J. Evans & Co.
ATTORNEYS Aug. 20, 1940.    W. S. ROLLINGS    2,212,076
ANTISKID DEVICE
Filed Jan. 15, 1940    3 Sheets-Sheet 3
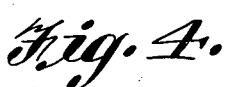
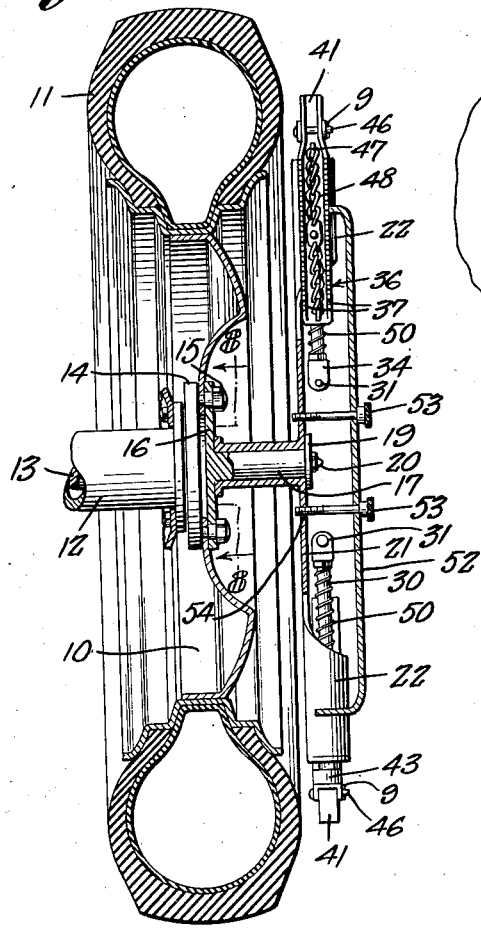
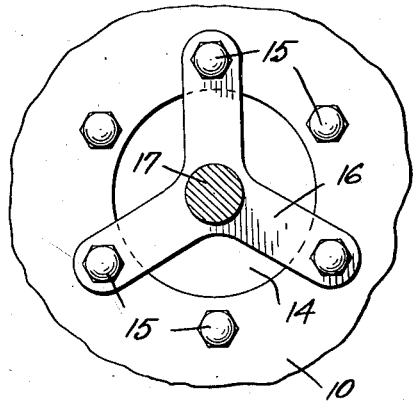
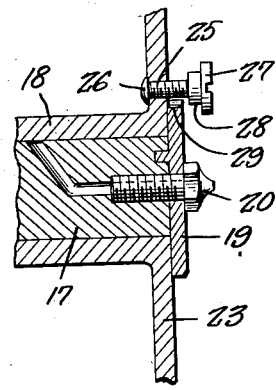
William S. Rollings,
INVENTOR
BY Victor J. Evans & Co.
ATTORNEYS Patented Aug. 20, 1940

2,212,076

UNITED STATES PATENT OFFICE 2,212,076

ANTISKID DEVICE

William S. Rollings, West Newton, Pa.

Application January 15, 1940, Serial No. 314,012

5 Claims. (Cl. 152—216)

This invention relates to antiskid devices and has for an object to provide an auxiliary wheel adapted to be permanently attached to a motor vehicle wheel and having antiskid cross chain carrying channel bars which may be moved to operative position on the tread of the tire without the use of special tools, within two or three minutes' time for each wheel, and may be applied by unskilled persons without undue exertion.

A further object is to provide a device of this character in which the auxiliary wheel is attached to the vehicle wheel through the medium of a single cap screw.

A further object is to provide an auxiliary wheel having a hub cap which may be applied to hold the antiskid channel bars and cross chains in folded position, without rattling, when the device is not in use.

A further object is to provide a device of this character which will be formed of a few strong simple and durable parts, which will be inexpensive to manufacture, and which will not easily get out of order.

With the above and other objects in view the invention consists of certain novel details of construction and combinations of parts hereinafter fully described and claimed, it being understood that various modifications may be resorted to within the scope of the appended claims without departing from the spirit or sacrificing any of the advantages of the invention.

In the accompanying drawings forming part of this specification:

Figure 3 is a cross sectional view of the vehicle wheel and tire and showing the antiskid chains and channel bars in the position shown in Figure 1.

Figure 4 is a cross sectional view through the vehicle wheel and tire and showing the cross chains and channel bars rocked to folded position, as shown in Figure 2.

Figure 5 is a detail sectional view with parts in elevation showing one end of a cross chain receiving channel bar and its stem the section being taken on the line 5—5 of Figure 1.

Figure 6 is a plan view of the parts shown in Figure 5.

Figure 7 is a detail sectional view showing the lower end of one of the stems and showing the pin for restricting the stem to endwise movement.

Figure 8 is a detail cross sectional view taken on the line 8—8 of Figure 4.

Figure 9 is a detail cross sectional view taken on the line 9—9 of Figure 1 with the locking notch turned through an angle of 180°.

Figure 10 is a detail cross sectional view taken on the line 10—10 of Figure 3.

Figure 1:
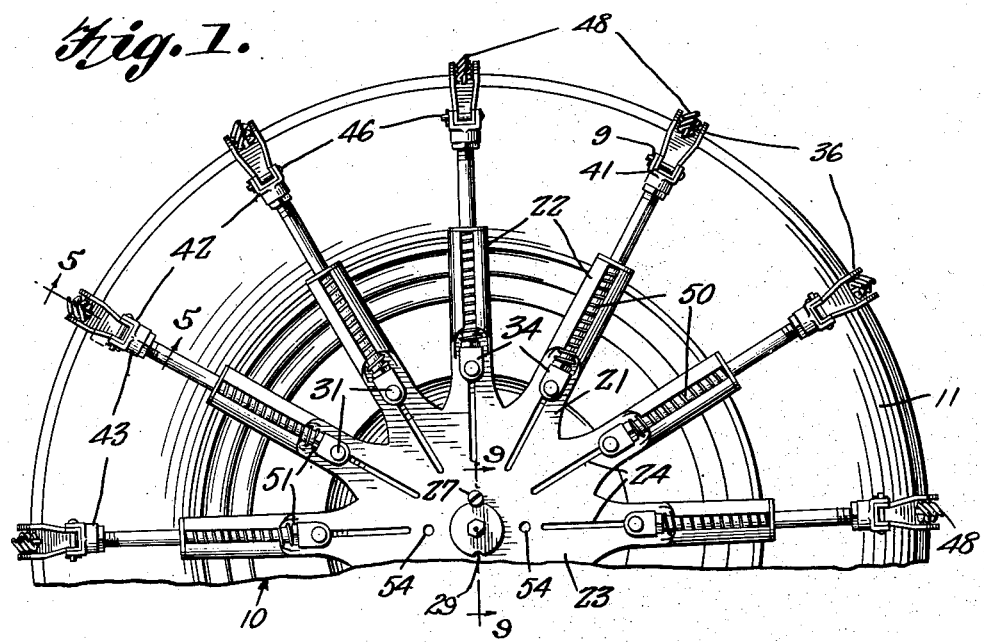
Figure 1 is a fragmentary side elevation of an automobile wheel and tire equipped with an auxiliary wheel and antiskid devices constructed in accordance with the invention, and showing the cross chains and channel bars in operative position.

Referring now to the drawings in which like characters of reference designate similar parts in the various views, 10 designates a motor vehicle wheel, 11 the pneumatic tire thereof, 12 the axle housing, 13 the axle, 14 the axle flange and 15 the bolts which secure the wheel to the flange, these parts being conventional.

In carrying out the invention an auxiliary antiskid wheel is provided comprising a spider 16, best shown in Figure 8, which is secured to the flange 14 by the bolts 15. The spider is provided with an integral auxiliary shaft 17 upon which is loosely mounted the hub 18 of the auxiliary wheel. The hub is held against endwise movement by a non-rotating washer 19 and a combined greasing fitting and cap screw 20.

Formed integral with the hub 18 is a plurality of spokes 21 formed of sheet metal, the outer ends of the spokes being rolled to form respective cylindrical housings 22. The inner ends of the spokes merge into a common disk 23 which is provided with radially disposed guide slots 24, the purpose of which will presently appear. The disk may be locked to the shaft 17 by a screw bolt 25, best shown in Figure 9. The bolt is threadedly engaged in an opening in the disk and is headed up on the inner end as shown at 26. The bolt is equipped with a nut 27 having a collar 28 which may be advanced into a notch 29 in the washer 19 to fixedly secure the disk to the washer and shaft 17 and prevent rotation of the auxiliary wheel when the antiskid device is not in use. When the antiskid device is to be used the nut 27 is backed off to free the screw 25 from the washer 19 and permit the hub 18 to idle on the shaft 17 and thus permit the antiskid devices to creep on the tire and prevent injury to the tire.

Loosely mounted in each housing 22 is a stem 30, one end of which projects from the inner open end of the housing and is equipped with a pin 31 which projects into the beforementioned slot 24 in the disk 23 to confine the stem to endwise movement. As best shown in Figure 7, the pin has sleeved thereon a helical spring 32 which is housed in a recess 33 formed in a nut 34 which is threaded onto the inner end of the stem. The spring bears against a collar 35 on the pin and normally holds the pin yieldably engaged in the slot 24. When the pin is withdrawn from the slot against the tension of the spring the stem may be rotated on its axis for a purpose which will presently appear.

The outer end of each stem is equipped with a respective antiskid channel bar 36 having parallel flanges 37 and a web 38, as best shown in Figure 7. The ends 39 and 40 of the bar are directed at an angle to overlap the sides of the tire when the channel bar is disposed transversely across the tread of the tire to engage the sides of the tire, and prevent twisting of the bar on the tire due to road friction.

The channel bar is extended outwardly from the end 40 to form a straight stop arm 41, best shown in Figure 6, which is received between the flanges 42 formed on a channeled socket member 43 which is threadedly engaged with the upper end of the stem 30 and is adjustably confined in place by a lock nut 44. The flanges 42 of the socket member are provided with hinge ears 45 through which, and the inclined end 40 of the channel bar, a pivot pin 46 is passed and held in place by a cotter pin 9. The stop arm engages the web of the channel bracket 43 when the antiskid bar 36 is disposed in operative position on the tire tread, and prevents the bar from being thrown outwardly by centrifugal force.

The bar 36 is provided with outwardly opening hooks 47 which are struck from the web of the bar near the angularly bent ends 39 and 40. The terminal links of the antiskid cross chains 48 are hooked underneath the hooks 47. When the cross chains are worn through at the center and become broken, the ends of the chain slip off of the hooks 47 and drop to the road so that the fenders of the vehicle are not mutilated.

The flanges 37 of the antiskid bar are formed with teeth 49 on the edges. These teeth form antiskid projections, which, when the cross chains 48 are broken and eliminated, lend antiskid qualities to the bar.

A helical spring 50 is sleeved on each stem 30. The spring bears at one end against the closed outer end of the housing 22 and at the inner end bears against an adjusting nut 51 which is threaded on the stem and engages the pin carrying nut 34. The spring is under compresion and tends constantly to urge the stem 30 inwardly so that the antiskid channel bar 36 is held snugly against the tread of the tire.

Figure 2:
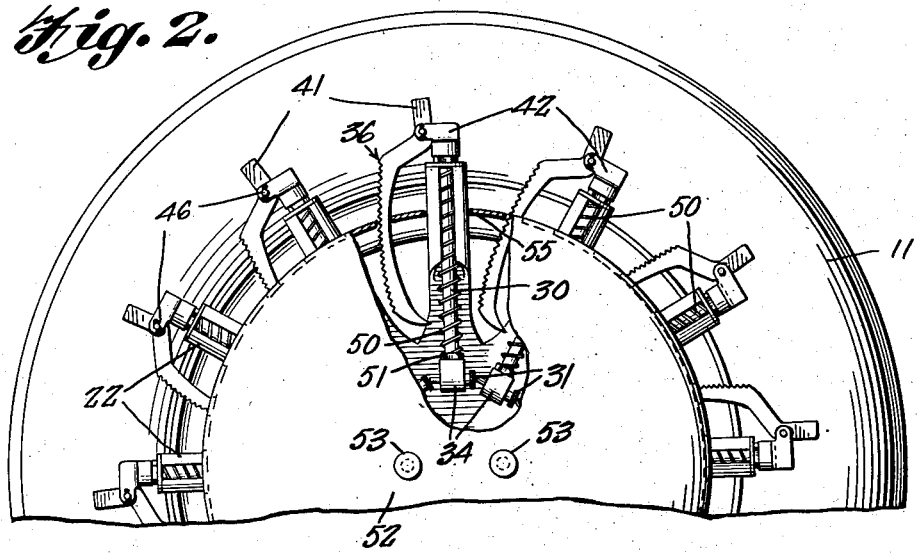
Figure 2 is a fragmentary side elevation of the parts shown in Figure 1, but showing the channel bars and cross chains in folded position and held against rattling by a hub cap.

When not in use the antiskid channel bars 36 are rocked on their pivots 45 to extend along the housings 22, as shown in Figure 2. For locking the antiskid bars in this position, and to prevent rattling of the bars, a hub cap 52 is applied to the disk 23 by a pair of screws 53, best shown in Figure 4, engaged through the openings in the hub cap and threadedly engaged in openings 54 formed in the disk, as best shown in Figure 1. The hub cap is provided with slots 55 to snugly receive the housings 22 and is provided with slots 56 to snugly receive the channel bars 36, as best shown in Figure 2.

When the antiskid auxiliary wheel is to be used, the screws 53 are unscrewed from the disk 23 and the hub cap removed. Then the antiskid bars 36 are rocked outwardly on their pivots 46 to extend parallel with the side of the tire and then are rocked through an arc of 90° to extend transversely of the tread of the tire in which position the bars are snugly held against the tire by the compressed helical springs 50. This operation takes only a few minutes for each tire and may be performed without tools and with minimum manual effort.

When it is desired to release the antiskid bars from the tire, the bars may be rocked through an arc of 90° to extend along the side of the tire and then rocked inwardly on pivots to extend along the housings 22. The hub cap is now applied to lock the antiskid bars in released position.

From the above description it is thought that the construction and operation of the invention will be fully understood without further explanation.

What is claimed is:

1. The combination with the axle flange and bolts of a rubber tired motor vehicle wheel, of a spider secured to said flange by said bolts, an integral auxiliary shaft projecting from the spider disposed co-axially with the vehicle wheel, an auxiliary wheel hub on said shaft, means for coupling and uncoupling the hub from the shaft, spokes projecting from the hub, channel bars pivotally and rotatably secured at one end to the spokes and adapted to be swung transversely of the tread of the vehicle wheel tire and adapted to be folded back from the tire along said spokes, and antiskid chains carried by the channel bars.

2. The combination with a rubber tired motor vehicle wheel, of an auxiliary antiskid wheel hub carried by the vehicle wheel co-axial with the vehicle wheel, a disk integral with the hub, hollow tubular spokes projecting radially from the disk, a stem slideably and rotatably mounted in each tubular spoke, spring means housed in each tubular spoke connected to the stem for normally urging the stem toward the axis of the hub, a gude pin carried by each stem, radially disposed slots in the disk receiving respective guide pins and restricting the stem to endwise movement, means for detaching the guide pins from the slots to permit the stems to be rotated axially, channel bars pivotally secured at one end to the stems and adapted to be swung transversely of the tread of the vehicle tire and adapted to be folded back from the tire along the spokes, and antiskid cross chains carried by the channel bars.

3. The combination with a rubber tired motor vehicle wheel, of an auxiliary antiskid wheel, a hub for the auxiliary wheel, a shaft connected to the vehicle wheel co-axial with the vehicle wheel and receiving the hub, a cap screw detachably securing the hub to the shaft, means for coupling and uncoupling the hub from the shaft to permit the auxiliary wheel to respectively rotate as a unit with the vehicle wheel and to idle on the shaft, channel bars pivotally and rotatably secured at one end to the auxiliary wheel and adapted to be swung transversely of the tread of the tire of the vehicle wheel, and antiskid chains carried by the channel bars.

4. The combination with a rubber tired motor vehicle wheel, of an auxiliary antiskid wheel, a hub for the auxiliary wheel, a shaft connected to the vehicle wheel co-axial with the vehicle wheel and receiving the hub, a cap screw detachably securing the hub to the shaft, means for coupling and uncoupling the hub from the shaft to permit the auxiliary wheel to respectively rotate as a unit with the vehicle wheel and to idle on the shaft, channel bars pivotally and rotatably secured at one end to the auxiliary wheel and adapted to be swung transversely of the tread of the tire in operative position and adapted to be swung to extend toward the axis of the auxiliary wheel in released position, antiskid chains carried by the channel bars, and a hub cap removably secured to the auxiliary wheel and having notches receiving the channel bars for securing the channel bars in released position and for preventing rattling of the channel bars.

5. The combination with a rubber tired motor vehicle wheel, of an auxiliary antiskid wheel carried by the vehicle wheel co-axially with the vehicle wheel, hollow spokes for the auxiliary wheel forming housings closed at the outer end, stems in the housings, compression springs bearing against the outer ends of the housings, said springs being connected to the stems and urging the stems toward the axis of the auxiliary wheel, channel socket members on the outer ends of the stems, channel bars pivotally secured to the socket members, stop arms extending from the bars adapted to engage the bottom of the socket members and prevent the bars being thrown outwardly by centrifugal force, said bars being adapted to be swung on the stems as pivots transversely of the tread of the vehicle tire, said springs holding said bars in engagement with the tread of the vehicle wheel tire, means for coupling the auxiliary wheel to the vehicle wheel to rotate as a unit therewith in released position and for uncoupling the auxiliary wheel from the vehicle wheel to permit the channel bars to creep upon the tire and not injure the tire in operative position, and antiskid cross chains carried by the channel bars.

WILLIAM S. ROLLINGS.